C. L. PARTRIDGE.
BENCH SAW.
APPLICATION FILED MAY 8, 1917.
1,348,440.
Patented Aug. 3, 1920.
2 SHEETS—SHEET 1.
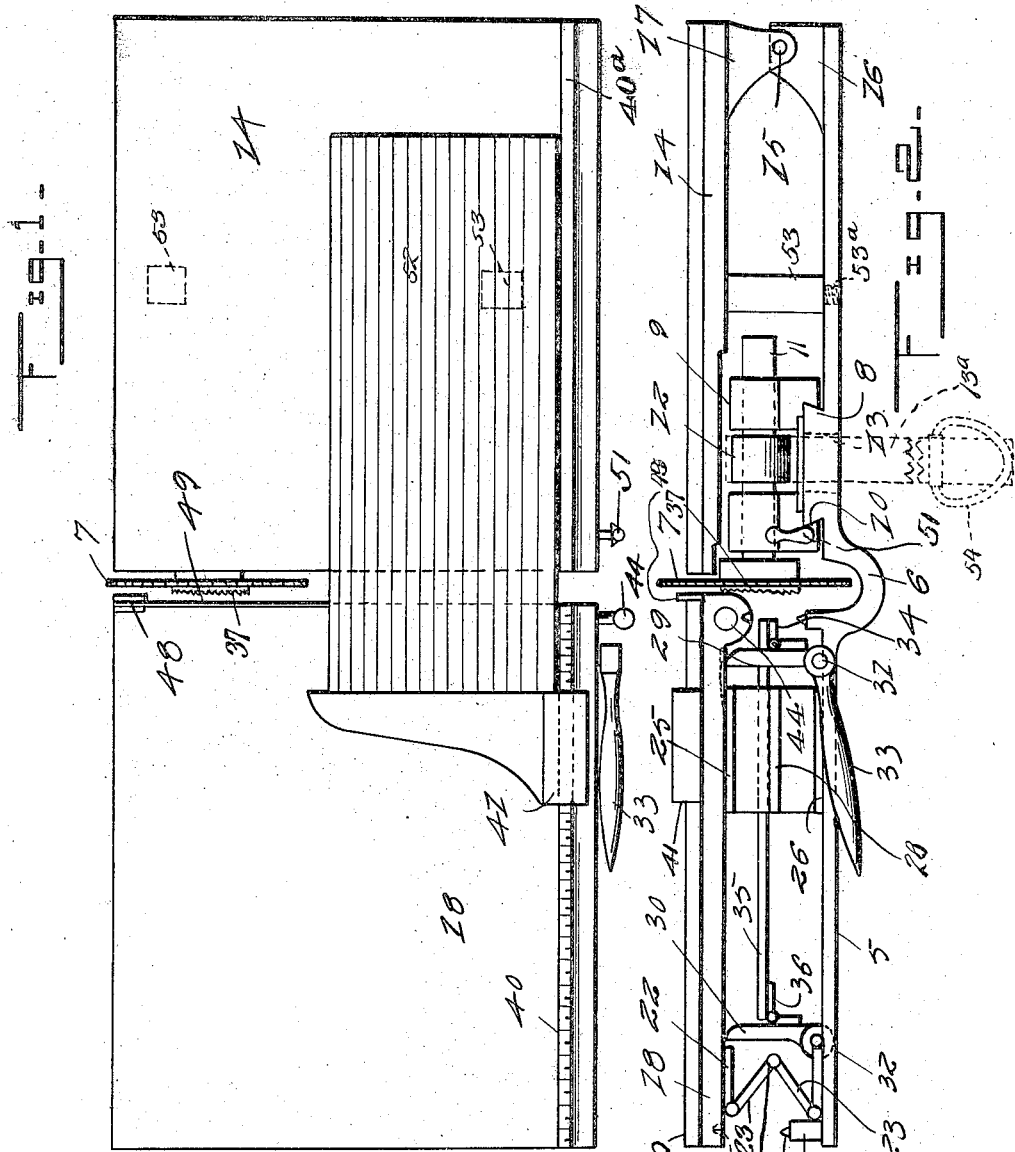

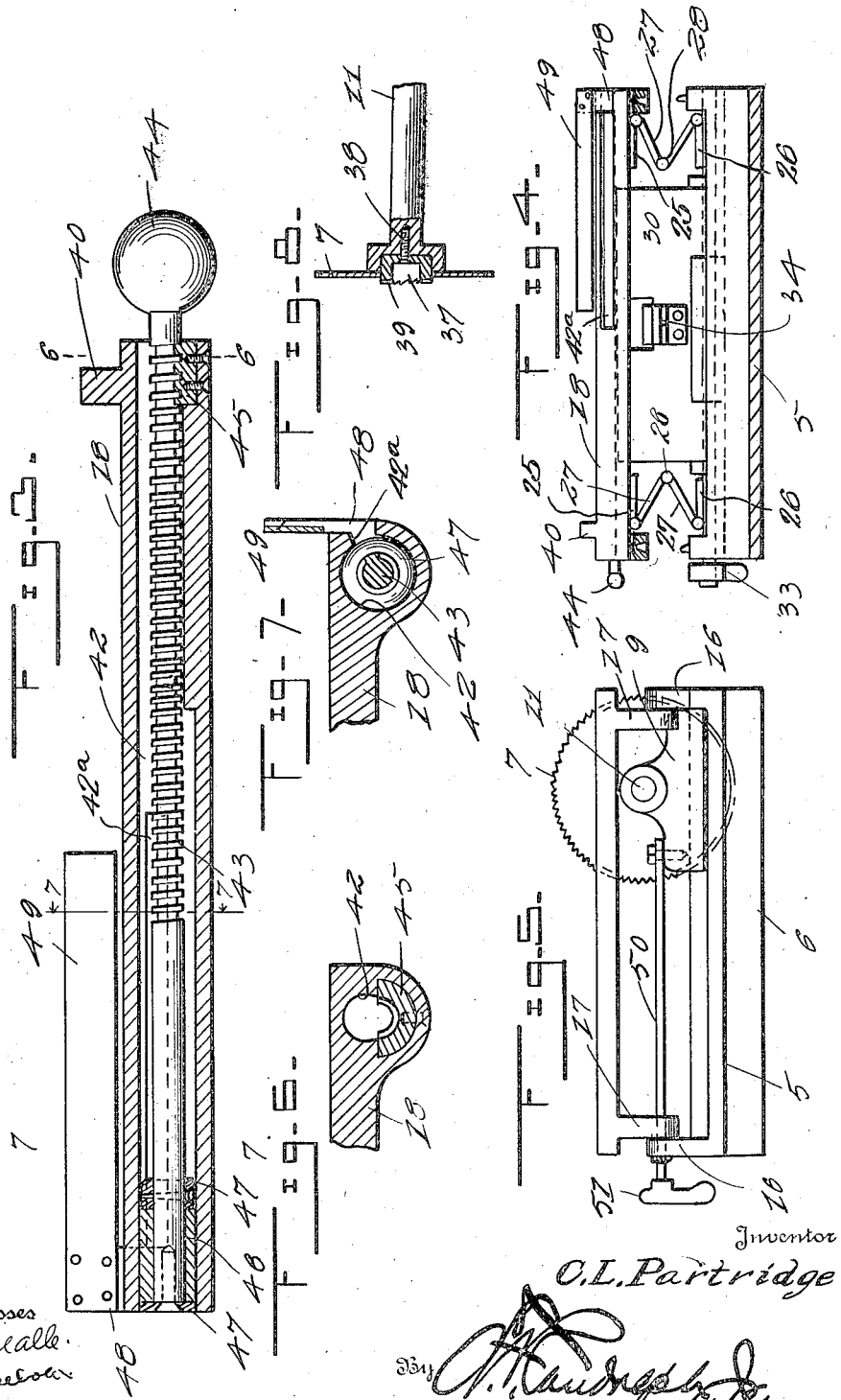

UNITED STATES PATENT OFFICE.

CHARLES L. PARTRIDGE, OF OMAHA, NEBRASKA.

BENCH-SAW.

1,348,440. Specification of Letters Patent. Patented Aug. 3, 1920.

Application filed May 8, 1917. Serial No. 167,236.

*To all whom it may concern:*

Be it known that I, CHARLES L. PARTRIDGE, a citizen of the United States, residing at Omaha, in the county of Douglas and State of Nebraska, have invented certain new and useful Improvements in Bench-Saws; and I do hereby declare the following to be a full, clear, and exact description of the invention, such as will enable others skilled in the art to which it appertains to make and use the same.

This invention relates to improvements in sawing machines of the type ordinarily used in cutting up slugs of metal in printing offices, although the invention is not necessarily limited to such use.

The invention has for its primary object to provide a sawing machine including novel features of construction, permitting exceptionally accurate adjustment of the parts.

Another object is the provision of a sawing machine including a traveling saw and a vertically movable table including means to secure an accurate vertical adjustment of the table.

With these and other objects in view, the invention consists in the novel construction, combination and arrangement of parts as will be hereinafter specifically described, claimed and illustrated in the accompanying drawings, in which:

Figure 1 represents a plan view of the improved sawing machine,

Fig. 2 represents a front elevation thereof,

Fig. 3 represents a transverse sectional view through the inner edge of the vertically movable table, Fig. 4 represents an end elevation, partly in section, of the sawing machine, Fig. 5 represents an elevation of the opposite end of the sawing machine, Fig. 6 represents a detail sectional view on the line 6—6 of Fig. 3, Fig. 7 represents a detail sectional view on the line 7—7 of Fig. 3, and Fig. 8 represents a side elevation, partly in section, of the saw and arbor removed.

Referring to the drawings in detail, wherein similar reference numerals designate corresponding parts throughout the several views, the numeral 5 indicates the base plate of a sawing machine having the medial portion depressed along its transverse line and located at approximately the center of the plate to provide a groove 6 to accommodate the saw, designated generally by the numeral 7. At one side of the groove 6, the base plate 5 is formed with a boss 8 constituting a guide or track for the saw carriage 9, which is slidably mounted thereon and is confined by the inclined edges 10 of the guide 8. The arbor 11 of the saw is rotatably supported in the carriage 9 and a pulley 12 is secured thereto and is adapted to receive a belt $13^a$, indicated in dotted lines in Fig. 2, which extends downwardly through an elongated slot 13 formed in the guide 8 and is adapted to be connected with a source of power whereby the saw is operated, the slot 13 permitting movement of the carriage and belt with relation to the base plate 5. A belt tightener 54 indicated diagrammatically in Fig. 2 of the drawings keeps the belt 13 in engagement with its pulley 12 during such movement.

A table top 14 is arranged on one side of the saw 7 and is pivotally supported at its outer end by hinge rods 15, which extend through apertures in ears 16 and 17 connected directly with the base plate 5 and table 14, respectively. Inwardly beyond the pivots 15, the table top 14 rests upon the upper ends of posts 53. These posts are provided at their lower ends with studs $53^a$ which are threaded into the base plate 5 to connect the posts thereto and to permit of vertical adjustment of the posts when it is necessary to level the table top 14.

A vertically adjustable table 18 is arranged on the side of the saw 7 opposite the table 14 and is supported, when lowered, upon studs 19 formed upon the base plate and having reduced terminals 20, adapted to be received in recesses 21 formed in the under surface of the table top 18. Plates 22 are secured to the adjacent surfaces of the outer ends of the base plate 5 and table 18 and the plates are pivotally connected with links 23, which latter are pivotally secured together at 24. The axes of the links are disposed transversely of the base plate 5 and thus secure the table 18 against transverse movement with relation to the base plate, but permit vertical movement of the table with relation thereto. At its inner end, the table is provided with plates 25, which are connected with plates 26 secured to the base plate 5 by links 27, which are pivotally secured together at 28. The pivotal axis of the links 27 and the plates 26 is disposed at right angles to the axis of the links 23, so as to prevent any lateral movement of the table 18 whatever, but permitting the latter to move in a vertical direction above the base plate 5.

Cam plates 29 and 30 are pivotally mounted upon rods 31 and 32, respectively, secured to the base plate 5, and the outer free longitudinal edges of the cam plates are curved for engaging the under side of the table 18. A handle 33 is secured to the inner hinge rod 31, which projects forwardly of the base plate 5, whereby the cam plate 29 may be manually tilted to elevate or lower the table 18. A hinge 34 is secured to the inner cam plate 29 and is connected by a rod or link 35 with a hinge 36 secured to the outer cam plate 30, whereby the movement of the cam plate 29, effected by means of the handle 33, is transmitted to the cam plate 30 to cause both plates to move in synchronism and thus uniformly raise and lower the opposite ends of the table 18. When the table 18 is raised, its upper surface is in horizontal alinement with the corresponding surface of the table 14.

As stated, the arbor 11 is supported in bearings carried by the saw carriage 9 and the terminal of the arbor carrying the saw 7 is recessed to accommodate a cutter or trimmer 37, which is secured in position by a screw 38 and is provided with laterally projecting cutting teeth 39. When using the rotary cutter 37 the table 18 is lowered to dispose the work in proper position with relation to the cutter.

A rib or stop 40 is secured to or formed integral with the upper side of the saw table 18 near the forward edge thereof and supports and guides the side gage 41. The rib or stop 40 is provided with pica or another standard measurement to facilitate accurate adjustment of the side gage 41. A rib on stop 40ª is formed on the upper side of the table 14 near the forward edge thereof, and it is in alinement with the rib or stop 40.

The inner edge of the table 18, adjacent the saw 7, is increased in thickness and formed with a longitudinal opening 42, receiving a movable screw 43 which projects forwardly of the table 18 and is provided with a handle or knob 44 to facilitate adjustment thereof. The screw 43 when released drops upon a plate 45 secured in the forward end of the opening 42 and having curved grooves therein to accommodate the external threads of the screw 43, whereby the latter is secured in adjusted position. By elevating the screw 43 the latter may be conveniently moved longitudinally without any rotary movement whatever.

A sleeve 46 is rotatably mounted upon the rear terminal of the screw 43 and is confined between collars 47. A laterally projecting arm 48 is formed integral with the sleeve 46 and carries a forwardly directed gripping blade or arm 49, which projects through a slot 42ª communicating with the opening 42 and is adapted to securely clamp a slug of metal, or other material, firmly against the gage 40. In order that the arm may be quickly brought against the work, the screw 43 is lifted out of engagement with the plate 45 and is moved longitudinally through the opening 42, and the screw is subsequently rotated in the proper direction to cause the threads to feed the arm toward the work and thus firmly clamp the latter in position.

In order to conveniently feed the saw into the work, a rod 50 is secured to the carriage 9 and extends forwardly of the machine. The front end of the rod carries a handle 51 for convenience in sliding the saw carriage back and forth upon the guide 8.

The machine may be used to cut up strips of metal into leads, rules and slugs, and to trim the ends of leads, rules and slugs. When it is desired to cut up strips, such as 52 in Fig. 1 of the drawings, into leads, rules or slugs, the strips are placed upon the tables 14 and 18 in engagement with the ribs or stops 40 and 40ª and in engagement with the gage 41, which has been previously set to determine the length of leads, rules or slugs desired. The arm 49 is then brought into engagement with the adjacent strip 52 to secure the strips against any accidental movement with relation to the tables 14 and 18. The saw carriage 9 is then moved forwardly through the medium of the rod 50, moving the rotating saw 7 through the strips 52. The leads, rules or slugs thus formed may be removed from the table 18 after the clamping arm 49 has been moved rearwardly out of engagement with the adjacent lead, slug or rule. When it is desired to trim the ends of leads, rules or slugs, the table 18 is lowered onto the posts 19. The gage 41 is then set, and the leads, rules or slugs are secured upon the table 18 in contact with the rib or stop 40 and gage 41 by the arm 49. The saw carriage 9 is then moved forwardly through the medium of the rod 50, bringing the rotating trimmer 37 in contact with the leads, rules or slugs.

The machine may be used also for the purpose of cutting down leads, rules or slugs to any desired length, and when using the machine for this purpose the table 14 is swung upon its pivots 15 into a laterally and upwardly inclined position, it being supported in such position by the engagement of the outer edge of the table with the outer edges of the ears 16. During this use of the machine, the table 18 is in raised position, and in view of the position of the table 14, the cut off portions of the leads, rules or slugs will drop directly away from the saw instead of remaining upon the table 14, as would be the case if the table 14 were in its normal horizontal position during the cutting off of the ends of leads, rules or slugs.

What I claim is:

1. In a sawing machine, a base plate, a rotary saw supported upon the base plate, a rotary cutter associated with the saw, a vertically adjustable table arranged laterally of the saw, and means for supporting the table in various positions to support work in position to be operated upon by either the saw or rotary cutter.

2. In a sawing machine, a base plate, a vertically movable table arranged upon the base plate, and pivoted links connecting the table with the base plate to prevent lateral movement of the table with relation to the base plate.

3. In a sawing machine, a base plate, a vertically movable table arranged upon the base plate, and a plurality of angularly related links connecting the table with the base plate to prevent lateral movement of the base plate with relation to the table.

4. In a sawing machine, a saw, a table arranged at an angle to the surface of the saw, work engaging and positioning means on said table, an axially and laterally movable screw supported in said table, a threaded socket for engagement with part of the screw, and a work engaging projection on said screw.

5. A machine of the character set forth including a rotary cutter, a trimmer carried centrally by the cutter for rotation therewith and projecting beyond one side thereof, a table located at said side of the cutter, means adjustably supporting the table, and means adapted to prevent the table from having any horizontal movement.

6. A machine of the character set forth including a slidably mounted carriage, a cutter rotatably mounted on the carriage, a trimmer carried centrally by the cutter for rotation therewith and extending beyond one side thereof, a table located at that side of the cutter, adjustable means supporting the table, and means adapted to prevent the table from having any horizontal movement.

7. In a sawing machine, a base plate, a rotary cutter supported by the base plate, a trimmer carried centrally by the rotary cutter and extending beyond one side thereof, a vertically adjustable table located at that side of the rotary cutter, means for supporting said table in position to permit the work to be acted upon by the rotary cutter and in position to permit the work to be acted upon by the rotary trimmer, a second table located on the opposite side of the rotary cutter and hinged adjacent one of its edges to said base plate, and posts adjustable on the base plate for supporting said second table inwardly beyond its hinge connection with the base plate.

In testimony whereof I affix my signature in presence of two witnesses.

CHARLES L. PARTRIDGE.

Witnesses:
H. EARL SHAW,
FREDERICH F. FARMER.